United States Patent
Tsuchiya

(10) Patent No.: US 7,903,216 B2
(45) Date of Patent: Mar. 8, 2011

(54) LIQUID CRYSTAL DEVICE HAVING A STRIPE-SHAPED DIELECTRIC PROTRUSION IN THE TRANSMISSIVE DISPLAY AREA AND A CIRCULAR DIELECTRIC PROTRUSION IN THE REFLECTIVE DISPLAY AREA

(75) Inventor: Hitoshi Tsuchiya, Suwa (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 11/636,625

(22) Filed: Dec. 11, 2006

(65) Prior Publication Data

US 2007/0132927 A1    Jun. 14, 2007

(30) Foreign Application Priority Data

Dec. 12, 2005 (JP) ................. 2005-357477

(51) Int. Cl.
G02F 1/1335 (2006.01)
G02F 1/1337 (2006.01)

(52) U.S. Cl. .................. 349/129; 349/114; 349/117

(58) Field of Classification Search ............ 349/114, 349/129
See application file for complete search history.

(56) References Cited

U.S. PATENT DOCUMENTS

| | | | |
|---|---|---|---|
| 7,151,582 B2 | 12/2006 | Yoshida et al. | |
| 7,450,205 B2 | 11/2008 | Yoshida et al. | |
| 7,573,555 B2 | 8/2009 | Kurasawa | |
| 2003/0011731 A1* | 1/2003 | Yoshida et al. | 349/117 |
| 2003/0071952 A1* | 4/2003 | Yoshida et al. | 349/141 |
| 2004/0080690 A1* | 4/2004 | Ko et al. | 349/114 |
| 2004/0105062 A1* | 6/2004 | Lai et al. | 349/129 |
| 2004/0125296 A1* | 7/2004 | Sasabayashi | 349/129 |
| 2005/0219446 A1* | 10/2005 | Hisatake | 349/114 |
| 2005/0270449 A1* | 12/2005 | Koma et al. | 349/114 |
| 2006/0077323 A1 | 4/2006 | Kurasawa | |

FOREIGN PATENT DOCUMENTS

| | | |
|---|---|---|
| JP | A 11-242225 | 9/1999 |
| JP | A 2002-055343 | 2/2002 |
| JP | A 2002-202511 | 7/2002 |
| JP | A-2002-303869 | 10/2002 |
| JP | A 2002-350853 | 12/2002 |
| JP | A-2005-115275 | 4/2005 |

OTHER PUBLICATIONS

Jisaki, et al; (2001) "Development of transflective LCD for high contrast and wide viewing angle by using homeotropic alignment"; Asia Display/IDW; pp. 133-136.

* cited by examiner

Primary Examiner — David Nelms
Assistant Examiner — Jessica M Merlin
(74) Attorney, Agent, or Firm — K&L Gates LLP

(57) ABSTRACT

A liquid crystal device is provided in which a liquid crystal layer formed of a liquid crystal having a negative dielectric anisotropy is interposed between a first substrate and a second substrate disposed opposite to each other, the liquid crystal device including: an alignment film controlling the liquid crystal, the alignment film being disposed between the liquid crystal layer and the first substrate and between the liquid crystal layer and the second substrate in a vertical direction; a first wave plate and a first polarizing plate provided on a surface of the first substrate opposite to the liquid crystal layer; and a second wave plate and a second polarizing plate provided on a surface of the second substrate opposite to the liquid crystal layer. Here, an alignment control portion controlling alignment of the liquid crystal of the liquid crystal layer is provided on at least one of the first substrate and the second substrate. In addition, retardation axes of the first wave plate and the second wave plate are approximately perpendicular to each other, and at least one of the retardation axis of the first wave plate and the retardation axis of the second wave plate is arranged approximately parallel to a main alignment direction of the liquid crystal aligned by the alignment control portion.

11 Claims, 8 Drawing Sheets

LIQUID CRYSTAL DEVICE HAVING A STRIPE-SHAPED DIELECTRIC PROTRUSION IN THE TRANSMISSIVE DISPLAY AREA AND A CIRCULAR DIELECTRIC PROTRUSION IN THE REFLECTIVE DISPLAY AREA

BACKGROUND

1. Technical Field

The present invention relates to a liquid crystal device and an electronic apparatus.

2. Related Art

A TN (Twisted Nematic) mode has been widely used in liquid crystal devices. However, the liquid crystal device of the TN mode has a narrow view angle. Recently, a VA (Vertical Alignment) mode of the liquid crystal device is being commercialized as a liquid crystal device television and the like. Such liquid crystal device of the VA mode characterizes a wide viewing angle and a high-contrast display.

In the liquid crystal device with the VA mode, by aligning the liquid crystal in several directions in a pixel, the wide viewing angle is known to be embodied. In order to embody the configuration, slits (openings) in transparent electrodes such as ITO and the like may be configured and projections upside the transparent electrodes may be configured. By providing the slits and projections, a technology of controlling directions in which vertically aligned liquid crystal molecules are tilted is disclosed (for example, see JP-A-1999-242225).

However, when the projections or slits shaped openings are provided in the pixel, a transmissivity decreases. The reason is that the liquid crystal disposed on the projections or openings do not almost move at the time of applying voltage, and thus an area formed in the projection or the openings remains black at the time of a white display.

SUMMARY

An advantage of some aspects of the present invention is that it provides a liquid crystal device that prevents the transmissivity due to the projections or openings from decreasing at the time of aligning and characterizes the bright display, since a dielectric anisotropy representing vertical alignment in an initial alignment state includes a negative liquid crystal in the liquid crystal device.

According to an aspect of the invention, there is provided a liquid crystal device in which a liquid crystal layer formed of a liquid crystal having a negative dielectric anisotropy is interposed between a first substrate and a second substrate disposed opposite to each other, the liquid crystal device including: an alignment film controlling the liquid crystal, the alignment film being disposed between the liquid crystal layer and the first substrate and between the liquid crystal layer and the second substrate in a vertical direction; a first wave plate and a first polarizing plate provided on a surface of the first substrate opposite to the liquid crystal layer; and a second wave plate and a second polarizing plate provided on a surface of the second substrate opposite to the liquid crystal layer. Here, an alignment control portion controlling alignment of the liquid crystal of the liquid crystal layer is provided on at least one of the first substrate and the second substrate. In addition, retardation axes of the first wave plate and the second wave plate are approximately perpendicular to each other, and at least one of the retardation axis of the first wave plate and the retardation axis of the second wave plate is arranged approximately parallel to a main alignment direction of the liquid crystal aligned by the alignment control portion.

When a liquid crystal cell is rotated with an arrangement of optic axes of the polarizing plate and the wave plate fixed, the maximum transmissivity may be obtained, thereby preventing the transmissivity due to the alignment control portion from decreasing and obtaining a bright display.

In the liquid crystal device, a first alignment control portion extending in a first direction and a second alignment control portion extending in a direction perpendicular to the first direction may be provided in the pixel area. The retardation axis of the first wave plate may be approximately parallel to the first direction and the retardation axis of the second wave plate may be approximately parallel to the second direction.

The first alignment control portion and the second alignment control portion are disposed approximately parallel to the retardation axes of the first wave plate or the second wave plate, thereby preventing the transmissivity due to the alignment control portion from decreasing and obtaining a bright display.

In the liquid crystal device, a longitudinal island-shaped electrode may be formed in the pixel area and the alignment control portion extending in the longitudinal direction of the island-shaped electrode may be disposed in a plane area of the longitudinal island-shaped electrode. In this case, at least one of the retardation of the first wave plate and the retardation axis of the second wave plate may be approximately parallel to the extending direction of the alignment control portion.

In the liquid crystal device including the longitudinal island-shaped electrode and the corresponding longitudinal alignment control portion in the pixel area, the retardation axis of the wave plate is perpendicular to the alignment direction of the liquid crystal determined by alignment control portion, thereby preventing the transmissivity from decreasing.

In the liquid crystal device, a plurality of the alignment control portions may be disposed in a plane area of a plurality of the island-shaped electrodes, respectively, so as to correspond to the plurality of island-shaped electrodes. In this case, at least one of the retardation axis of the first wave plate and the retardation axis of the second wave plate may be disposed in the pixel area in the alignment direction of the alignment control portion.

When a plurality of alignment control portions is provided, it is preferable that a main alignment direction of the liquid crystal determined by the plurality of the alignment control portion is parallel to the retardation axis of the wave plate, as described above. Accordingly, the retardation axis of the wave plate may be arranged parallel or vertically to the main alignment direction, thereby preventing the transmissivity from decreasing.

In the liquid crystal device, the alignment control portion may include one of dielectric projections projecting into the liquid crystal layer from an electrode provided on the liquid crystal layer side of one of the first substrate and the second substrate, openings formed in the electrode, and combinations of the dielectric projections and the openings. Accordingly, the alignment direction is properly controlled at the time of applying voltage to a vertical-aligned liquid crystal thereby obtaining a high-quality display without a surface irregularity and the like.

In the liquid crystal device, the wave plates may be a $\lambda/4$ wave plate for applying a substantial ¼ phase difference to transmitted light. Alternatively, the wave plates may be an inverse-dispersion $\lambda/4$ wave plate.

Accordingly, since the polarizing plate and the wave plate serve as a circular polarizing plate, a light transmitting the liquid crystal layer is converted into a circular polarizing light, thereby preventing a part of an umbra from occurring in a sub-pixel and obtaining a bright display.

In the liquid crystal device, a transmissive display area and a reflective display area may be defined in the pixel area. In this case, a liquid-crystal-layer thickness adjusting layer adjusting the thickness of the liquid crystal layer in the reflective display area to be smaller than the thickness of the liquid crystal layer in the transmissive display area may be provided on the liquid crystal layer side of at least one of the first substrate and the second substrate. That is, the liquid crystal device according to some aspects of the invention may be embodied as a transflective liquid crystal device including a multi-gap configuration.

An electronic apparatus includes the liquid crystal device described above. Accordingly, a liquid crystal device of the vertical aligned mode of achieving a high-brightness, a high-contrast, and a wide-viewing angle may be provided for a display of an electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
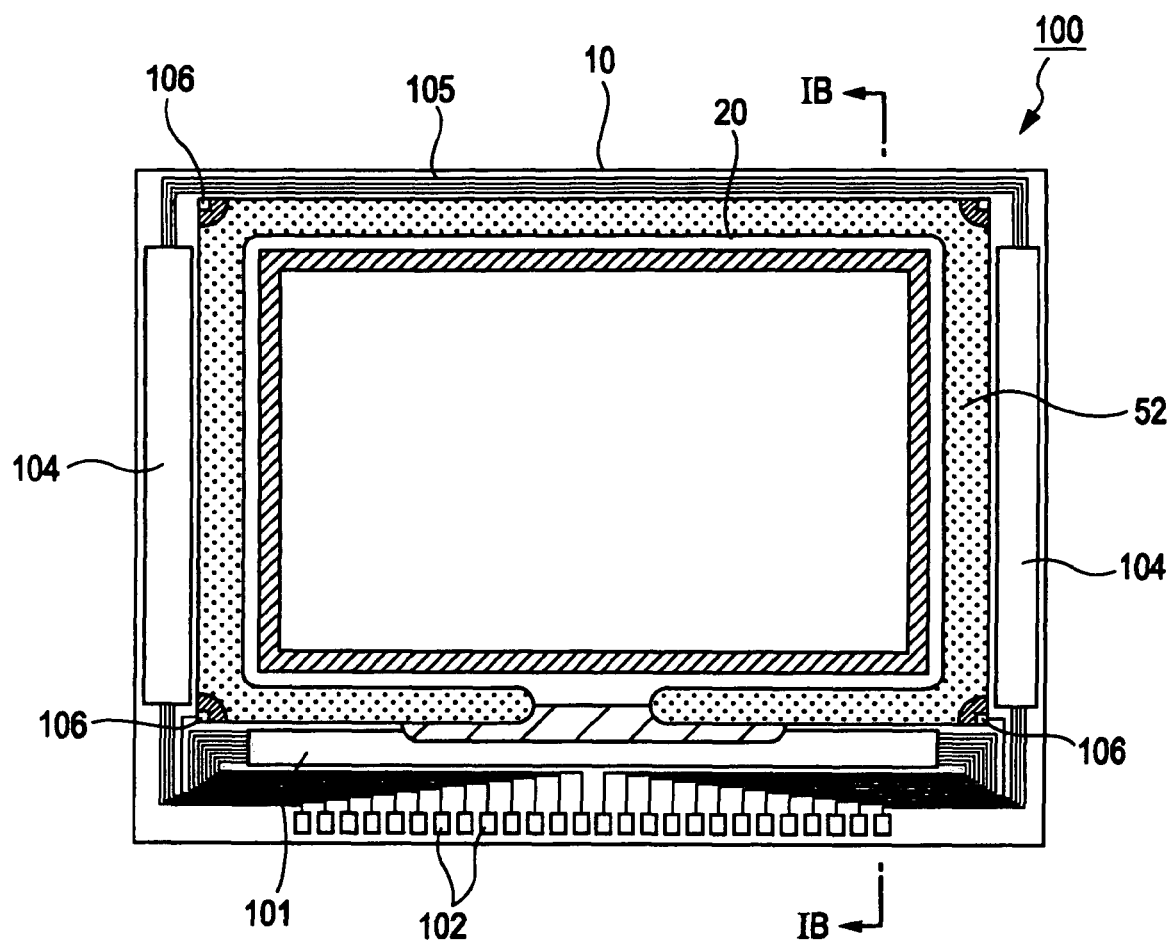
FIGS. 1A and 1B are overall view of a liquid crystal device according to an aspect of a first embodiment.

Hereinafter, Embodiments according to an aspect of an aspect of the present invention will be described, but this technology according to an aspect of the invention is not limited to the following embodiments. In the drawings, scales of elements are properly changed for the purpose of visual convenience.

In the present application, a liquid crystal layer in each configuration member of a liquid crystal device indicates an internal side, and the opposite indicates an external side. A minimum unit of image display is "a sub-pixel" and a set of a plurality of the sub-pixels including a color filter is "a pixel." In addition, "at the time of applying a non-selection voltage" and "at the time of applying a selection voltage" mean "when a voltage applied to the liquid crystal layer is near a threshold voltage of the liquid crystal" and "when a voltage applied tot eh liquid crystal layer is sufficiently higher than a threshold voltage of the liquid crystal", respectively. In a transflective liquid crystal device according to an aspect of the following embodiment, a display-possible area using a light entering from a display surface side of the liquid crystal in a plane area of the sub-pixel is called "a reflective display area", and another display-possible area using a light entering from a back surface side (opposite to the display area) of the liquid crystal device is called "a transmissive display area".

First Embodiment

First, a liquid crystal device 100 according to an aspect of a first embodiment of the present invention is described, seeing FIG. 1 to FIG. 4.

The a liquid crystal device 100 according to an aspect of the first embodiment is a pixel switching element and an active matrix type of a transmissive liquid crystal device employing a thin film transistor (Thin Film Transistor: hereinafter, referred to as "TFT").

Figure 1B:
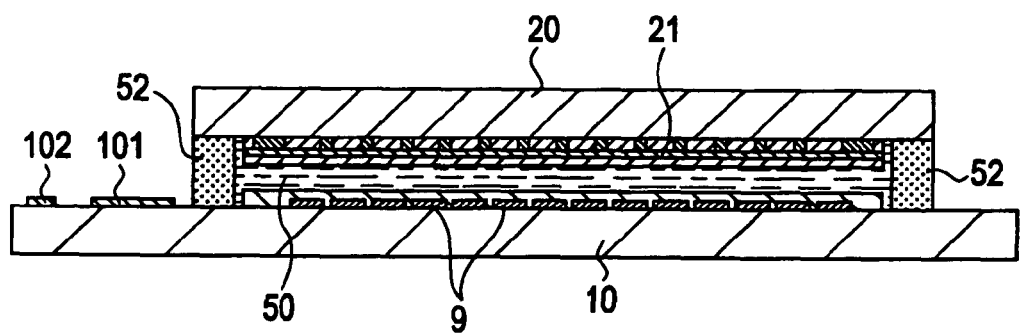

FIG. 1A is a plain view of a counter substrate side illustrating each configuration element of a liquid crystal device, and FIG. 1B is a cross sectional view crossing H-H' in FIG. 1A.

As shown FIGS. 1A and 1B, in the liquid crystal device 100 according to an aspect of the embodiment, a TFT array substrate 10 and a counter substrate 20 are bonded with a seal material 52, and a liquid crystal layer 50 is sealed in an area partitioned by the seal material 52. In a circuit area outside the seal material 52, a data signal drive circuit 101 and an external circuit implementation interface 102 are formed along one side of the TFT array substrate 10, and each scan signal drive circuit 104 is formed along two sides adjacent to the side. A plurality of a pixel electrode 9 are formed inside the TFT array substrate 10 so as to face the liquid crystal layer 50, and a common electrode 21 is formed inside the counter substrate 20. Conductive members 106 are arranged at the corners of the counter substrate 20 in order to electrically connect the TFT array substrate 10 and the counter substrate 20.

Figure 2:
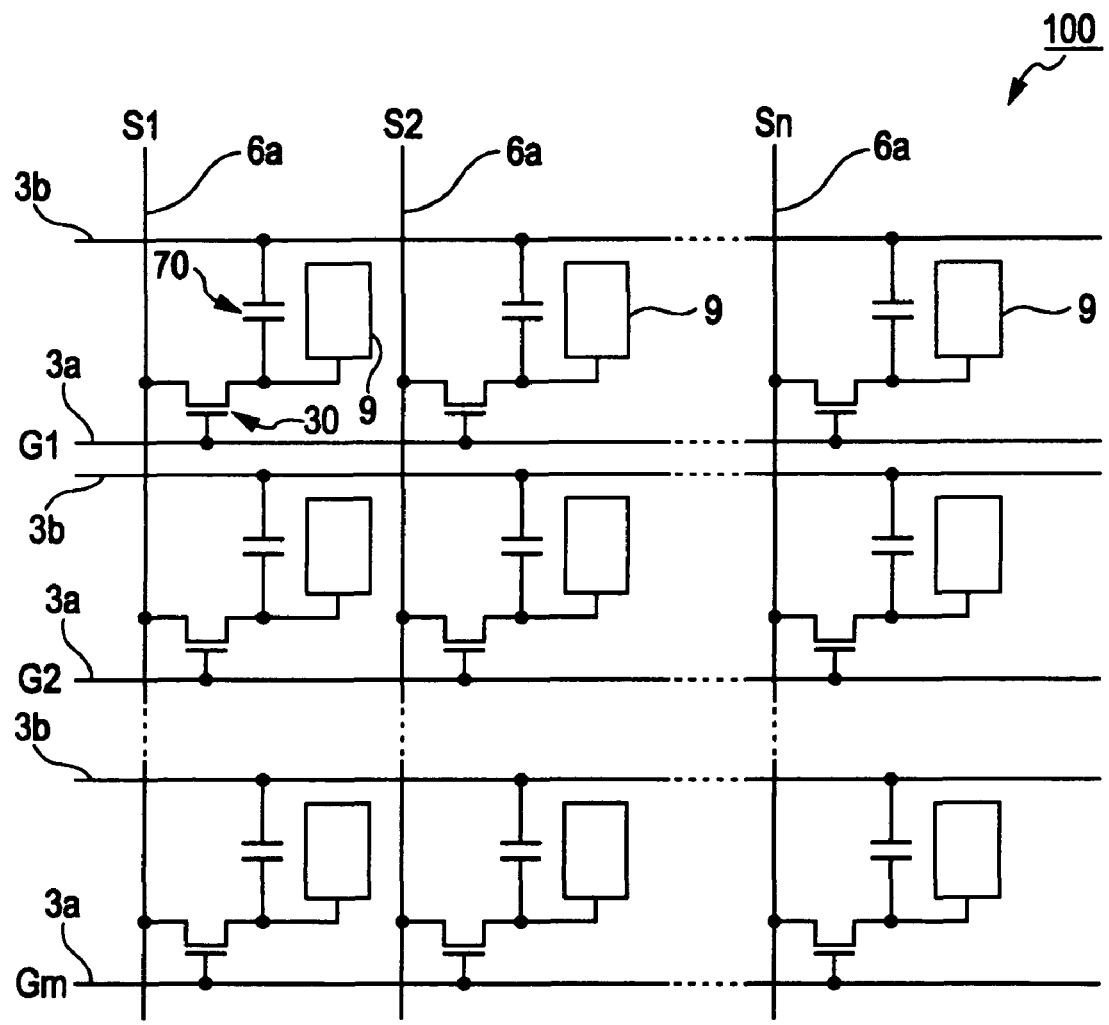
FIG. 2 is a circuit view of a liquid crystal device.

FIG. 2 is an equivalent circuit diagram using the TFT. In an image display area of the liquid crystal device, a data line 6a and a scan line 3a are arranged in a reticular pattern, and the sub-pixels which are a unit of image display are arranged near the intersection point of both lines. The pixel electrode 9 is provided in the plurality of the sub-pixel arranged in matrix shape. In the side of the pixel electrode 9, a TFT 30, a switching element, is arranged in order to electrically control. The data line 6a is electrically connected to a source of the TFT 30. The image signals S1, S2, . . . , Sn are provided to each data line 6a. The scan line 3a is electrically connected to a gate of the TFT 30. The scan 3a is provided with scan signals G1, G2, . . . , Gm as pulses at the predetermined timing. Additionally, the pixel electrode 9 is electrically connected to a drain of the TFT 30. When the TFT 30, the switching element, is in on-state for some time, the image signals S1, S2, . . . , Sn provided from the data line 6a are entered into a liquid crystal of each pixel at the predetermined timing due to the scan signals G1, G2, . . . , Gm provided from the scan line 3a.

The predetermined image signals S1, S2, . . . , Sn written in the liquid crystal are stored as a liquid crystal capacitor for some time between the pixel electrode 9 and the common electrode described below. In order to prevent the stored image signals S1, S2, . . . , Sn from leaking, a storage capacitor 70 between the pixel electrode 9 and a storage line 3b is formed and is paralleled with the liquid crystal capacitor. When a voltage signal is applied to the liquid crystal, a level of the applied voltage varies the alignment state of the liquid crystal. Accordingly, a light entered into the liquid crystal is modulated so as to be capable of displaying a gray scale.

Figure 3A:
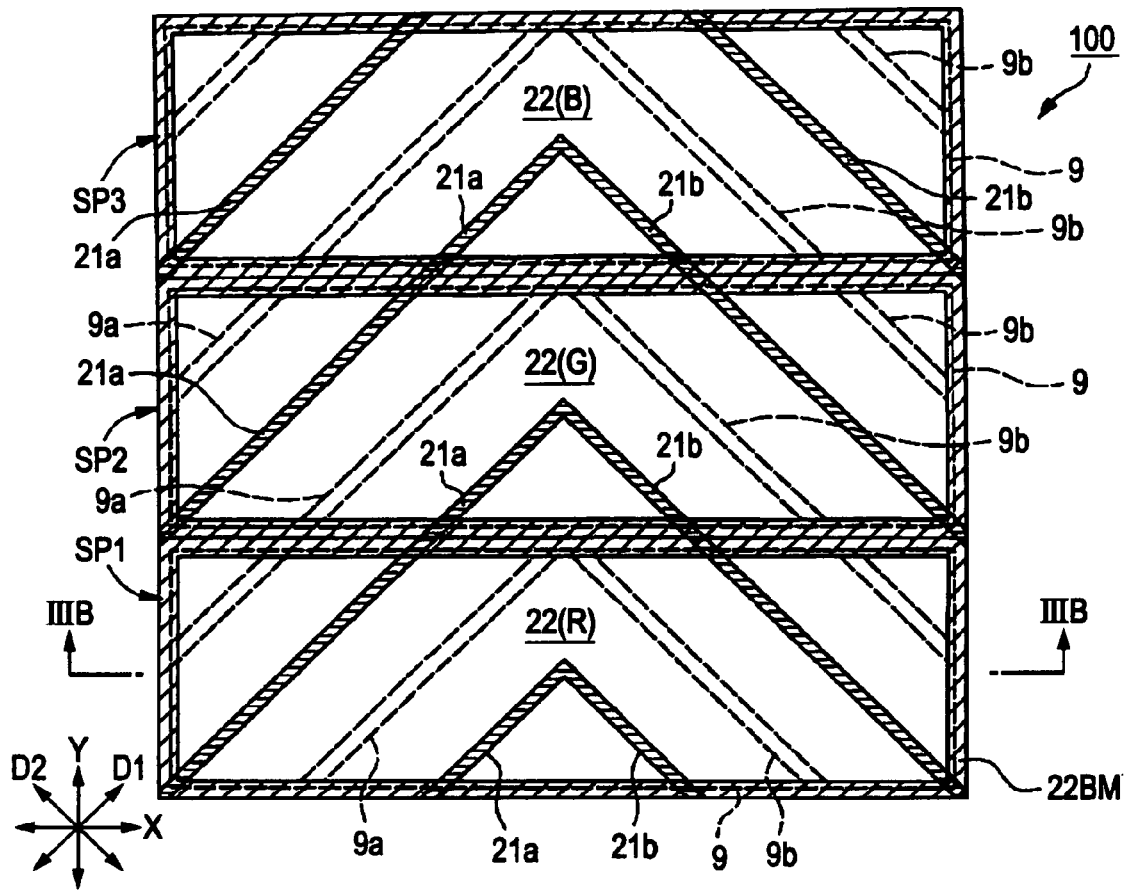
FIGS. 3A and 3B are a plane view and a cross-sectional view of one pixel.
Figure 3B:
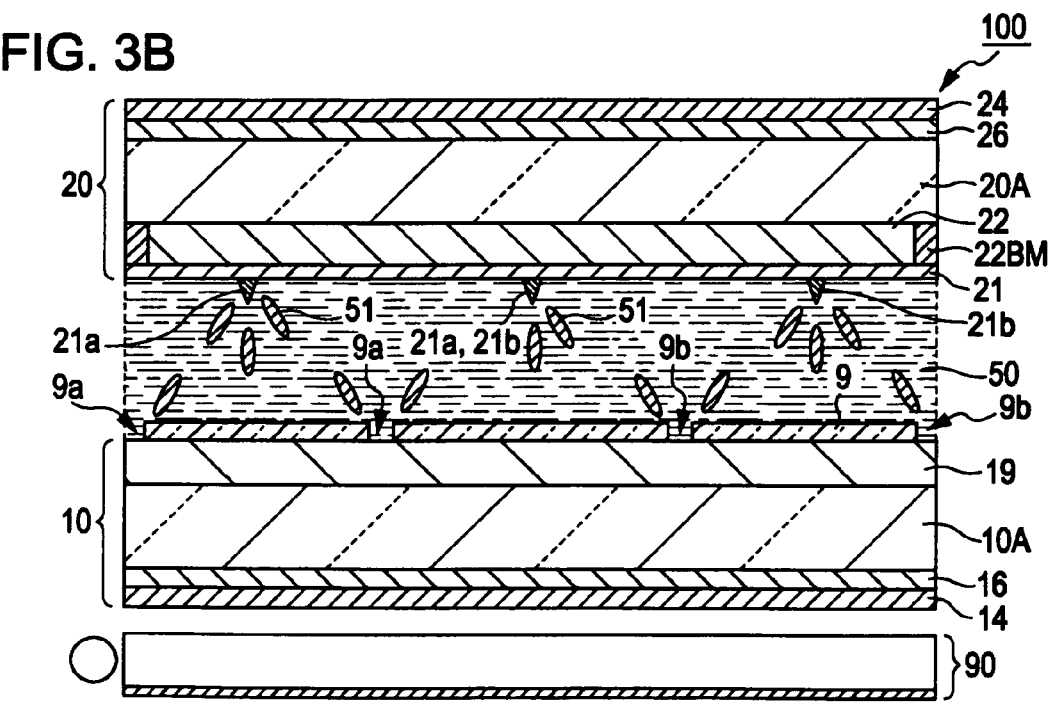
Figure 4A:
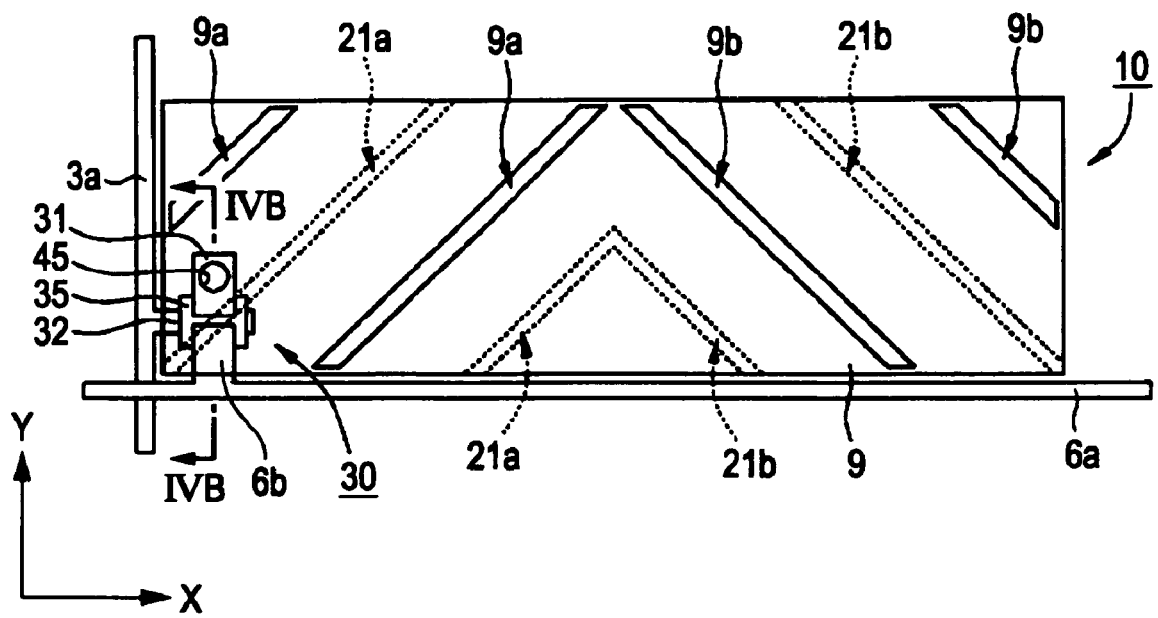
FIGS. 4A and 4B are plane view and a cross-sectional view of a TFT array substrate in one sub-pixel.
Figure 4B:
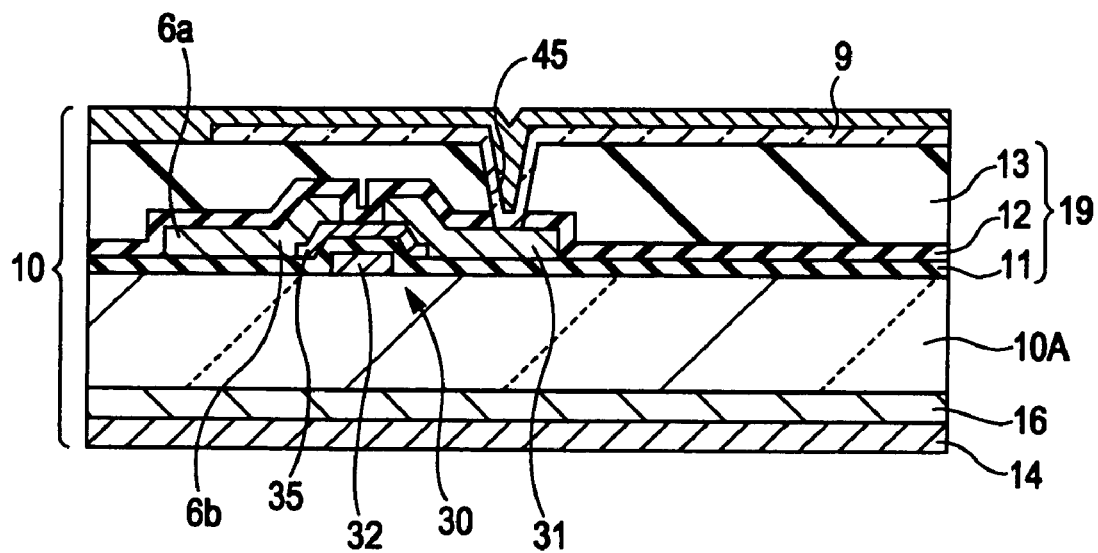

FIGS. 3A and 3B are diagrams illustrating the liquid crystal device according to an aspect of the embodiment, and FIG. 3A is a plane view of any one pixel in the liquid crystal device 100, and FIG. 3B is a cross sectional view crossing A-A1 in FIG. 3A. In addition, FIG. 4A is a diagram of illustrating a plane area of the TFT array substrate 10 in one sub-pixel, and FIG. 4B is a cross sectional view crossing B-B' in FIG. 4A.

As shown FIG. 3A, one pixel in the liquid crystal device 100 includes 3 adjacent sub-pixels SP1 to SP 3 in the Y axis direction. As shown FIG. 4A, in each rectangular-shaped sub-pixel SP1 to SP3, the pixel electrode 9 and the TFT 30, a pixel switching element, are provided. Additionally, the data line 6a extends in the longitudinal direction of the pixel electrode 9 (in the X axis direction), and the scan line 3a extends along the short direction (in the Y axis direction). The TFR 30 is formed near the intersection of the data line 6a and the scan line 3a and is electrically connected with the data line 6a and the scan line 3a.

One color filter (coloring layer) 22 of the three primary colors is corresponding to the sub-pixel, respectively, to be formed, and the one pixel including the three-color filters corresponding to the three sub-pixel is formed. A rectangular-shaped black matrix (a light-shielding film) 22 BM surrounding the each color filter 22 is provided and surrounds the sub-pixel SP1 to SP3, respectively.

As shown FIG. 3A, the pixel electrode 9 is made of transparent electrical conducting materials such as ITO (indium tin oxide) and the like, and a plurality of slit-shaped openings 9a and 9b controlling alignment of vertical aligned liquid crystal are formed in the pixel electrode 9, respectively. The opening 9a extends in the D1 direction ascending to the right side, and the opening 9b extends in the D2 direction descending to the right side. Additionally, a plurality of dielectric projections 21a and 21b parallel each other and forming a projection pair are provided in the sub-pixel, respectively. Both of the dielectric projections 21a extend parallel with the opening 9a or 9b in a first direction D1 and are arranged, intersecting with the opening 9a in a second direction D2. On the other hand, another two dielectric projections 21b extend parallel with the openings 9b in the second direction D2 and are arranged, intersecting with the openings 9b in the first direction D1. The dielectric projections 21a and the dielectric projections 21b arranged at the center of the sub-pixel in the X axis direction are connected at the center of the sub-pixel.

In FIG. 3A, the dielectric projections 21a between the sub-pixels adjoining along the Y axis continue to extend in the first direction D1 and the dielectric projections 21b continue to extend in the second direction D2. In addition, the openings 9a and 9b in the one sub-pixel are formed, adjoining with the extended Y axis.

As shown FIG. 4A, the TFT 30 is interposed between the scan line 3a and the data line 6a. The TFT 30 includes a semiconductor layer 35, a gate electrode 32 under the semiconductor layer 35 (a side of the substrate 10A), and a source electrode 6b and a drain electrode 31 on the semiconductor layer 35. A channel of the TFT 30 in an area facing with the gate electrode 32 under the semiconductor layer 35 is formed, and a source and drain areas are formed in both sides of the semiconductor layer.

The gate electrode 32 branches from a part of the scan line 3a to the direction of the data line 6a and the end of the gate electrode 32 faces to the semiconductor layer 35, with an insulating film interposed therebetween as not illustrated. The source electrode 6b branches from a part of the data line 6a to the direction of the scan line 3a and the end of the source electrode 6b is electrically connected with the source area of the semiconductor layer 35. One end of the drain electrode 31 is electrically connected to the drain area, and another end of the drain electrode 31 is electrically connected to a pixel electrode 9, with a contact hole 45 interposed therebetween. When a gate signal is entered through the scan line 3a, the TFT 30 is in on state for the predetermined time and can enter a image signal provided from the data line 6a at the predetermined timing.

As the cross sectional view is shown in FIG. 3B, the liquid crystal device 100 includes the TFT array substrate 10 and the counter substrate 20 facing the TFT array substrate 10, and the liquid crystal layer 50 in which a dielectric anisotropy includes a negative liquid crystal (for example, refractive-index anisotropy Δn is 0.1) is interposed between the substrates 10 and 20. As shown FIG. 3B, the liquid crystal layer 50 is formed to have a nearly regular thickness in the area of the pixel electrode 9. As an illuminator, a backlight 90 including a light source, a reflector, a polarizing plate, etc is provided in the exterior of the liquid crystal cell corresponding to the exterior of the TFT substrate 10. A bar-shaped ellipsoid 51 aligned vertically due to the dielectric projections 21a and 21b is notionally illustrated.

The TFT substrate 10 is formed on the basis of a main substrate 10A made of transmissive materials such as quartz, glass, etc. In the interior side (a side of the liquid crystal layer) of the main substrate 10A, a circuit layer 19 including the TFT 30 is formed and the pixel electrode 9 is formed on the circuit layer 19. As not illustrated on the pixel electrode 9, the pixel electrode 9 and an inter-layer insulating film 13 are covered to form a vertical alignment film such as a polyimide, and a liquid crystal 51 should be vertically aligned to the substrate surface at the time of not applying voltage. A first wave plate 16 and a first polarizing plate 14 are laminated on the exterior of the main substrate 10A.

As shown FIG. 4B, the circuit 19 has a plurality of wiring layers divided into the insulating films 11 to 13. The scan line 3a is formed on the main substrate 10A, the gate insulating film 11 is formed so as to cover the scan line 3a, and the semiconductor layer 35 is formed on a location facing the scan line 3a, with the gate insulating film 11 interposed therebetween. Additionally, the data line 6a, the source electrode 6b, and the drain electrode 31 are formed on the gate insulating film 11, and the source electrode 6b and the drain electrode 31 are electrically connected such that some part of them are on the semiconductor layer 35. The passivation film 12 is formed so as to cover the data line 6a and the inter-layer insulating film 13 is formed so as to cover the passivation film 12. The contact hole 45 is crossing through the passivation film 12 and the inter-layer insulating film 13 to the drain electrode 31, and the pixel electrode 9 and the drain electrode 31 formed on the inter-layer insulating film 13 are electrically connected.

The counter substrate 20 is formed on the basis of the main substrate 20A made of the transmissive materials such as quartz, glass, etc. A color filter 22 is provided in the interior side of the main substrate 20A. The color filter 22 has a plurality of coloring lines in which colors are different each other, and black-colored matrixes 22BM including black-colored resin and the like are arranged between the color filters in which a kind of colors are different.

The common electrode 21 is formed so as to cover the color filter 22 on the interior side of the main substrate 20A. The common electrode 21 is a transparent conductive film made of the plane-shaped ITO and the like, and the dielectric projections 21a and 21b projected to a direction facing the pixel electrode 9 on the common electrode 21 are provided on the liquid crystal 50. The cross sectional-shaped dielectric projections 21a and 21b are illustrated but the projections 21a and 21b are gradually curved-shaped. The dielectric projections 21a and 21b are made of dielectric materials such as resin and the like, and may be formed photolithography using a mask. For example, by using a positive photoresist of a novolak system, the dielectric projections 21a and 21b that are 1.2 μm high and 12 μm in diameter are formed. The photoresist is developed and is post-baked at 220° C. so as to obtain the gradual-shaped projections.

The illustration is omitted, but the vertical alignment film such as the polyimide and the like is formed so as to cover the common electrode 21 and the dielectric projections 21a and 21b, and an initial alignment of the liquid crystal 51 should be vertically aligned to the substrate surface. A second wave plate 26 and a second polarizing plate 24 are laminated in the exterior side of the main substrate 20A. The first polarizing plate 14 and a second polarizing plate 24 have a function of only transmitting a straight polarizing light that vibrates in the specific direction. Additionally, in the first wave plate 16 and the second wave plate 26, a λ/4 wave plate having a phase difference of an approximate λ/4 wavelength about a visible light is adopted.

Figure 5:
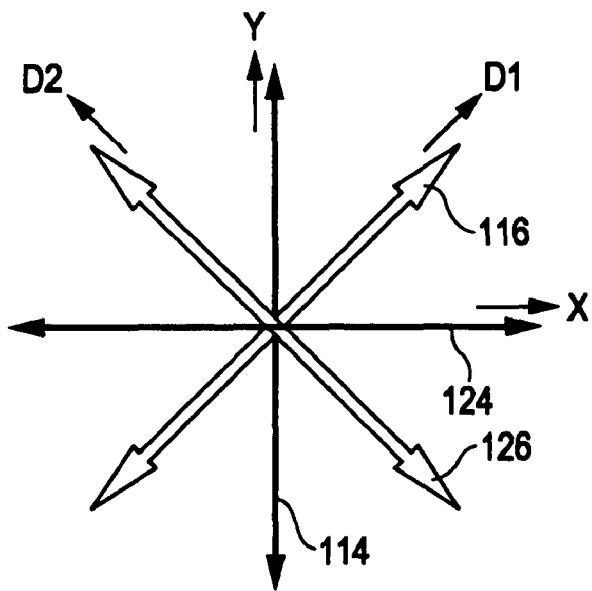
FIG. 5 is an arrangement of optic axes according to an aspect of a first embodiment.

In accordance with the embodiment, as optic axes are illustrated in FIG. 5, transmission axes 114 and 124 of the first polarizing plate 14 and the second polarizing plate 24 and retardation axes 116 and 126 of the first wave plate 16 and the second wave plate 26 are formed approximately at 45°, respectively. The first polarizing plate 14 and the first wave plate 16 collaborate and the second polarizing plate 24 and the second wave plate 26 collaborate, so as to function as a circular polarizing plate, respectively. A straight polarizing light is converted into a circular polarizing light, or vice versa by the circular polarizing plate. In addition, the transmission axis 114 of the first polarizing plate 14 meets at right angles to the transmission axis 124 of the second polarizing 24, and the retardation axis 116 of the first wave plate 16 meets at right angles to the retardation axis 126 of the second wave plate 26.

General formation of the polarizing plate and the wave plate are "the circular polarizing plate of forming the polarizing plate+a λ/4 plate", but a view angle quality of a display may be improved when "the circular polarizing plate of forming the polarizing plate+a λ/4 plate+a negative C plate" is employed. The negative C plate is a wave plate including an optical anisotropy layer showing an optically negative uniaxial property in the thickness direction.

In the liquid crystal device 100 according to an aspect of embodiment, a light emitting from the backlight 90 transmits the first wave plate 14 and the first wave plate 16 so as to be converted into the circular polarizing light and then entered into the liquid crystal layer 50. At the time of not applying voltage, since there is almost no anisotropy of a reflective index in the liquid crystal aligned perpendicularly to a substrate, an incident light passes the liquid crystal layer 50 with the circular polarizing light stored. Additionally, an incident light transmitting the second wave plate 26 of the side of the counter substrate 20 is converted into the straight polarizing light perpendicular to the transmission axis of the second polarizing plate. Since the straight polarizing plate does not transmit the second polarizing plate 24, the liquid crystal device 100 according to an aspect of the embodiment serves as a black display at the time of not applying voltage.

On the other hand, at the time of applying voltage, the liquid crystal is aligned to the direction of a substrate surface so as to show the anisotropy of the reflective index to a transmissive light. Accordingly, the circular polarizing light entering from the backlight 90 to the liquid crystal layer 50 is converted into the ellipsoidal polarizing light in the course of transmitting the liquid crystal layer 50. Even though the incident light transmits the second wave plate 26, the incident light is not converted into the straight polarizing light perpendicular to the transmission axis of the second polarizing plate 24. Accordingly, the liquid crystal device 100 according to an aspect of the embodiment serves as s white display at the time of applying voltage. By adjusting the applied voltage in the liquid crystal layer 50, the gray scale display may be embodied. In this embodiment, by the operation of the openings 9a and 9b formed in the pixel electrode 9 and the dielectric projection 21a and 21b formed on the common electrode 21, the liquid crystal 51 is aligned in the width direction of the openings 9a and 9b and the dielectric projections 21a and 21b controlling the alignment. That is, as shown in FIGS. 3A and 3B, at the time of applying voltage, the liquid crystal 51 is aligned from the openings 9a and 9b and the dielectric projections 21a and 21b to the exterior side near the openings 9a and 9b and the dielectric projections 21a and 21b, the liquid crystal 51 is aligned from the plane view to a second direction D2 in an area where the opening 9a and the dielectric projection 21a are formed, and the liquid crystal 51 is aligned to a first direction D1 in an area where the opening 9b and the dielectric projection 21b are formed. Accordingly, in the liquid crystal device 100 according to an aspect of the embodiment, a plurality of a liquid crystal area where a director of the liquid crystal 51 faces to another direction are formed, thereby achieving an extremely wide viewing angle.

As shown in FIG. 5, in the liquid crystal device 100 according to an aspect of the embodiment, the retardation axes 116 and 126 are arranged parallel to the first direction D1 and the second direction D2, respectively. That is, the retardation axis 116 of the first wave plate 16 is parallel to the first direction D1 that is the alignment direction of the liquid crystal 51 aligned by the opening 9b and the dielectric projection 21b extending along the second direction D2. Further, the retardation axis 126 of the second wave plate 26 is parallel to the second direction D2 that is the alignment direction of the liquid crystal 51 aligned by the opening 9a and the dielectric projection 21a extending along the first direction D1.

According to an aspect of the embodiment, the liquid crystal device 100 may control a lowering of the reflective index due to the openings 9a and 9b and the dielectric projections 21a and 21b, thereby obtaining a bright display.

Figure 6:
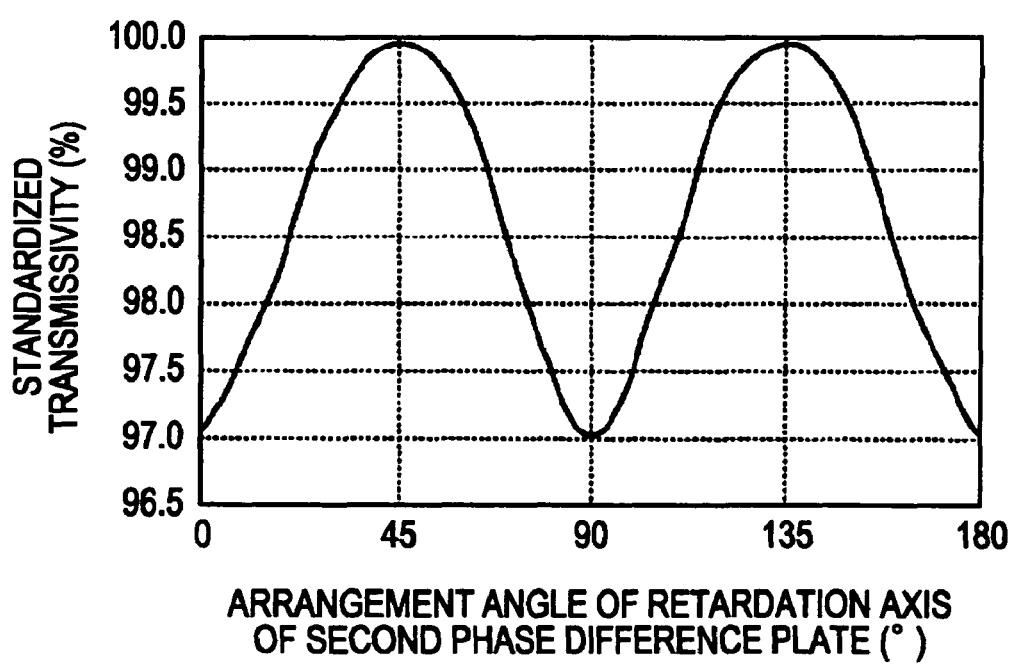
FIG. 6 is a graph showing relationship between an angle of a wave plate and transmissivity.

FIG. 6 is a graph illustrating a varied measurement result of a transmissivity of a white display, when the polarizing plate 14 and 24 and the wave plate 16 and 26 are integrally rotated, with the arrangement of the optical axes of the polarizing plate 14 and 24 and the wave plate 16 and 26 maintained. In the graph of FIG. 6, the horizontal axis indicates arranged angles of the retardation axis 126 of the second wave plate 26 and the vertical axis indicates standardized transmissivity, where the maximum transmissivity is 100%. Further, the arrangement of the optical axes is illustrated in FIG. 5 is when the retardation axis 126 of the second wave plate 26 is arranged at 135°.

When the polarizing plates 14 and 24 and the wave plates 16 and 26 are rotated to the liquid crystal cell, transmissivity are changed regarding the white display in FIG. 6. When the retardation axis 126 of the second wave plate 26 is at 45° and 135°, the transmissivity becomes the maximum value. That is, when the retardation axis 126 of the second wave plate 26 is parallel to the second direction D2 that is the alignment direction of the liquid crystal determined by the opening 9a and the dielectric projection 21a (in other words, perpendicular to the first direction D1) or when the retardation 126 of the second wave plate 26 is parallel to the first direction D1, the alignment direction of the liquid crystal determined by the opening 9b and the dielectric projection 21b (perpendicular to the second direction D2), the transmissivity of the white display becomes the maximum value. Accordingly, by arranging the retardation axes 116 and 126 of the wave plates 16 and 26 to the direction parallel or perpendicular to the alignment direction of the liquid crystal determined by the alignment control, a liquid crystal device with bright display may be embodied.

Second Embodiment

Figure 7A:
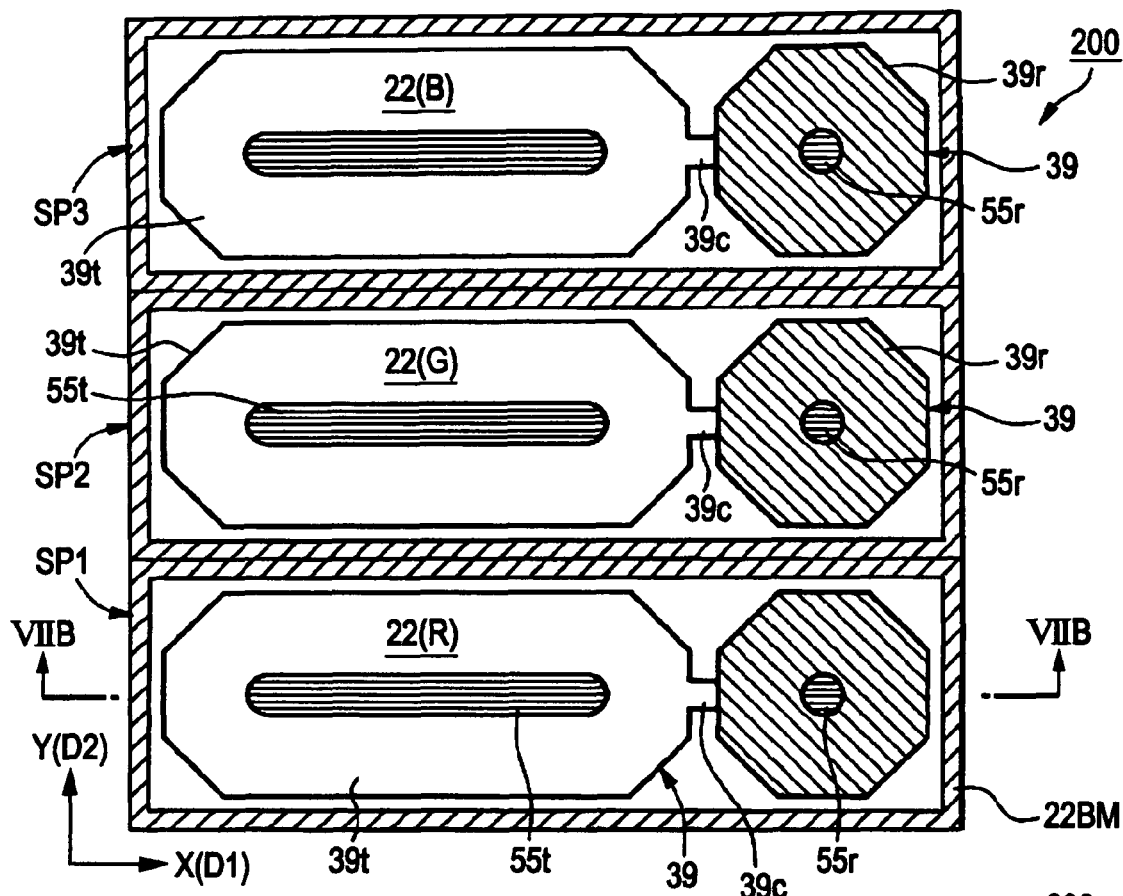
FIGS. 7A and 7B is views illustrating a liquid crystal device according to an aspect of a second embodiment.
Figure 7B:
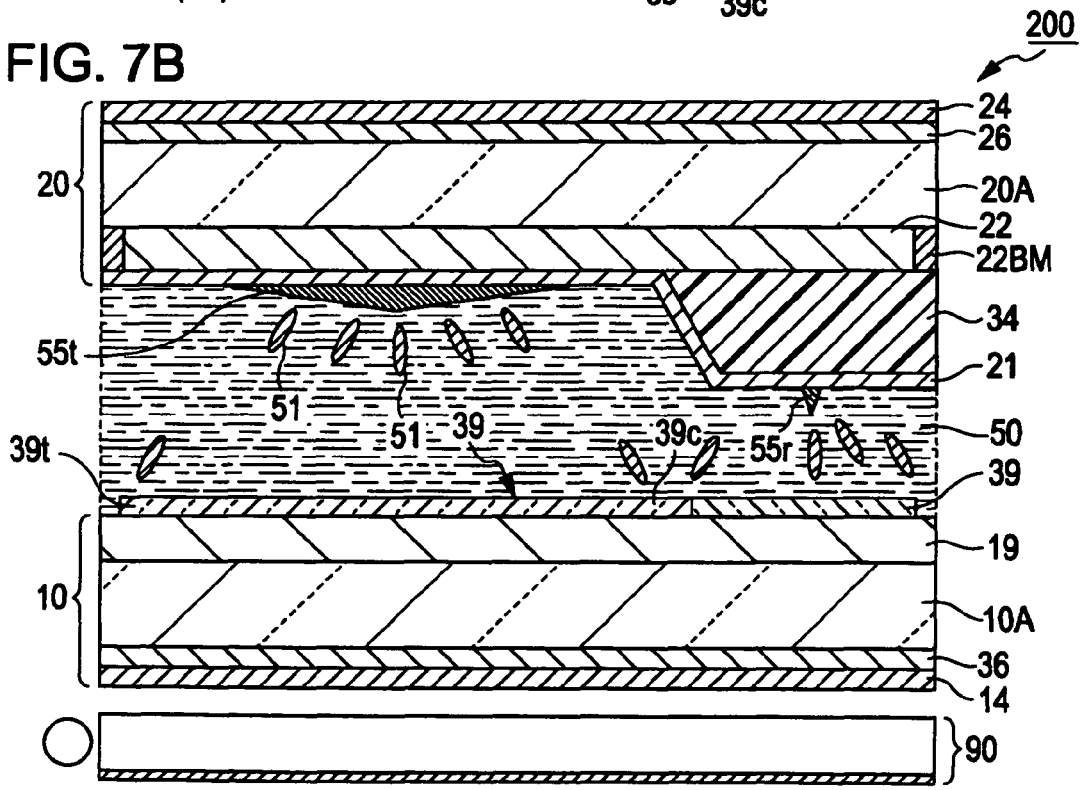

Next, a second embodiment according to an aspect of the present invention will be described. FIG. 7A is a plain view illustrating one pixel of a liquid crystal device 200, and FIG. 7B is a cross-sectional view crossing E-E' line in FIG. 7A. In the second embodiment, members or portions are named the same symbols as the first embodiment, and detailed descriptions will be omitted.

As shown in FIG. 7A, a liquid crystal device according to an aspect of the embodiment is a transflective liquid crystal device including a reflective electrode 39r in some area of sub-pixels SP1 to SP3 and is an active matrix-type of a liquid crystal device including a TFT, a switching element, as not illustrated.

A pixel electrode 39 is provided in the sub-pixel, respectively, and the pixel electrode 39 has two island-shaped electrodes connected electrically, with a connecting portion 39c interposed therebetween. The island-shaped electrode that makes an approximate octagon-shape and is made of a transparent conductive film such as ITO and the like is a transparent electrode 39t, and the island-shaped electrode that makes an approximately regular octagon-shape and is made of a light reflective metallic film such as aluminum, silver, etc is a reflective electrode 39r. A frame-shaped black matrix 22BM surrounding the pixel electrode 39 is formed, and a color filter 22 in an area surrounded by the black matrix 22BM is formed.

A reflective electrode 39r made of a light reflective metallic film such as aluminum, silver, etc may become a reflective layer of the corresponding sub-pixel, and a formation area of the reflective electrode 39r is a reflective display area. In addition, as not illustrated, unevenness is formed in a surface of the reflective electrode 39r, and by diffusing the reflected light on the unevenness, it is possible to obtain a display device having good visibility.

An area where the transparent electrode 39t is formed represents a transmissive display area T. Therefore, in the liquid crystal device according to an aspect of the embodiment, a little less than ⅓ area of a display possible area of one sub-pixel is the reflective display, and a little more than ⅔ area is the transmissive display.

Since the connecting portion 39c linking the transparent electrode 39t and the reflective electrode 39r is also made of the transparent conductive film, the connecting portion 39c is also the transmissive display. In an approximate middle of the transparent electrode 39t and the reflective electrode 39r, respectively, a dielectric projections 55t and 55r controlling an alignment of a liquid crystal are disposed. In the embodiment, the transparent electrode 39t and the reflective electrode 39r are shaped into the approximate octagon, but a circular-shape of which each corner is round is also possible.

As shown in FIG. 7B, the liquid crystal device 200 includes a TFT array substrate 10 and a counter substrate 20 facing the TFT array substrate 10, and a liquid crystal layer 50 in which a dielectric anisotropy is formed as a negative liquid crystal is interposed between the substrates 10 and 20. In an exterior side of a liquid crystal corresponding to an exterior side of the TFT array substrate 10, a backlight 90 is provided.

In an interior side (a side of the liquid crystal layer) of a main substrate 10A forming the TFT array substrate 10, a circuit layer 19 is formed as the same as the first embodiment, and a pixel electrode 39 including the transparent 39t and the reflective 39r is formed on the circuit layer 19. A vertical alignment film such as polyimide and the like is formed so as to cover the pixel electrode 39, and a liquid crystal 51 is aligned perpendicular to the substrate surface at the time of not applying a voltage. In an exterior side of the main substrate 10A, a first wave plate 36 and a first polarizing plate 14, an inverse-dispersion λ/4 wave plate, are laminated. When a value of a phase difference increases in the λ/4 wave plate of a reverse-wavelength diffusion, a circular polarizing light is obtained not by a wavelength of the transmitted light, by employing such wave plate, thereby being suitable for a color liquid crystal device.

In an interior side of a main substrate 20A forming the counter substrate 20, the color filter 22 extending in the reflective display area and transmissive display area is provided, and the black matrix 22BM surrounding the color filter 22 is formed. In an interior side of the color filter 22, a liquid crystal thickness-adjusting layer 34 corresponding to the reflective display area (an area forming the reflective electrode 39r) is selectively formed. Since the liquid crystal thickness-adjusting layer 34 forms the thickness partly in the sub-pixel, the layer thickness of the liquid crystal layer 50 is different in the reflective display area and the transmissive display area. The liquid crystal thickness-adjusting layer 34 is made of organic material films such as acrylic resin and the like. For example, a film is 2 μm±1 μm or so in thick, and the liquid crystal layer 50 is 2 μm to 6 μm or so in thick in an area where the liquid crystal thickness-adjusting layer 34 does not exist. A thickness of the liquid crystal layer 50 in the reflective display area is approximately half of that of the liquid crystal layer 50 in the transmissive display area. That is, the liquid crystal thickness-adjusting layer 34 has a function for adjusting the thickness of the liquid crystal layer 50 in the reflective display area and the transmissive display area, thereby achieving a multi-gap structure. The liquid crystal device 200 according to an aspect of the embodiment obtains a bright and high-contrast display due to the structure. An inclined surface where a total thickness of the liquid crystal thickness-adjusting layer 34 is continuously changed is formed near the border of the reflective display area and the transmissive display area. However, the inclined surface and the end area of the reflective electrode 39r and the transparent electrode 39t are overlapped on a plane view, and the inclined surface is overlapped with the connecting portion 39c on a plane view.

A common electrode 21 extending on surfaces of the color filter 22 and the liquid crystal thickness-adjusting layer 34 is formed in an exterior side of the main substrate 20A. Dielectric projections 55t and 55r that are projected into the liquid crystal layer 50 on the common electrode 21 facing the pixel electrode 39 are provided. The dielectric projections 55t and 55r are shaped into approximate triangles but are practically shaped into a gradually curve. In the transmissive display area, a belt-shaped dielectric projection 55t extending to the X axis direction is formed in a location facing the middle of the long transparent electrode 39t, and inn the reflective display area, the circular-shaped dielectric projection 55r is formed in a location facing the middle of the approximately right octagon-shaped reflective electrode 39r. Further, the dielectric projections 55t and 55r are arranged abreast to the X axis direction following arrangement of the transparent electrode 39t and the reflective electrode 39r. As not illustrated, a vertical alignment film such as polyimide and the like is formed so as to cover the common electrode 21 and the dielectric projections 55t and 55r, and an initial alignment of the liquid crystal 51 is aligned vertically to the substrate surface.

In an exterior side of the main substrate 20A, a second wave plate 46 and a second polarizing plate 24, an inverse-dispersion λ/4 wave plate, are laminated.

Figure 8:
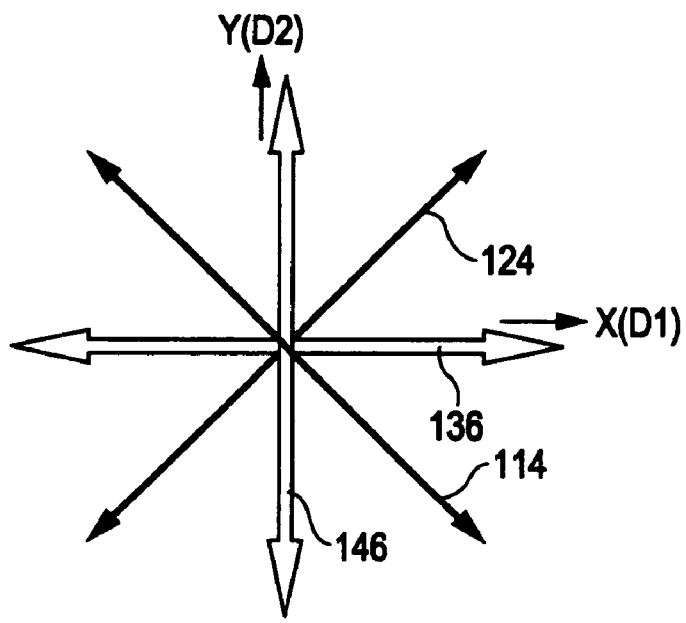
FIG. 8 is an arrangement of optic axes.

In accordance with the embodiment, as optic axes are illustrated in FIG. 8, transmission axes 114 and 124 of a first polarizing plate 14 and a second polarizing plate 24 and retardation axes 136 and 146 of a first wave plate 36 and a second wave plate 46 are formed approximately at 45°, respectively. The first polarizing plate 14 and the first wave plate 36 collaborate and the second polarizing plate 24 and the second wave 46 collaborate, so as to function as a circular polarizing plate, respectively. A straight polarizing light is converted into a circular polarizing light, or vice versa by the circular polarizing plate. In addition, the transmission axis 114 of the first polarizing plate 14 meets at right angles to the transmission axis 124 of the second polarizing 24, and the retardation axis 136 of the first wave plate 36 meets at right angles to the retardation axis 146 of the second wave plate 46. Further, in accordance with the embodiment, the retardation axis 136 of the first wave plate 36 is arranged parallel to the X direction, and the retardation axis 146 of the second wave plate 46 is arranged parallel to the Y direction.

In the liquid crystal device 200 according to an aspect of the second embodiment, a display of the transparent mode is operated as the same as the first embodiment, but the transparent electrode 39t is differently formed and the dielectric projection 55t controlling alignment is differently arranged. Accordingly, the liquid crystal 51 is differently operated at the time of applying voltage, thereby being different to the first embodiment. That is, in the second embodiment, the belt-shaped dielectric projection 55t extends in the middle of the transparent electrode 39t, and thus the liquid crystal 51 is tilted to be aligned from the dielectric projection 55t to the exterior Y axis direction in the extending area. Further, the liquid crystal 51 is aligned in a plane emitted shape from the end of the dielectric projection 55t to the most end of the transparent electrode 39t.

In the reflective mode, an outside light entering from exterior side of the counter substrate 20 transmits the second polarizing plate 24 or the second wave plate 46 and then is converted into a circular polarized light so as to enter into the liquid crystal layer 50. Since there is no refractive-index anisotropy in the liquid crystal aligned vertically to the substrate at the time of not applying voltage, the incident light passes through the liquid crystal layer 50 to reach the reflective electrode 39r with the circular polarized light stored. The incident light is reflected by the reflective electrode 39r and then returns to the liquid crystal layer 50 to enter into the second wave plate 46. In this case, since a rotation direction of the circular polarized light reflected by the reflective electrode 39r reverses, the incident light is converted into a straight polarized light perpendicular to the transmissive axis of the second polarizing plate 24 by the second wave plate 46. Further, since the straight polarizing plate does not transmit the second polarizing plate 24, the liquid crystal device 200 according to an aspect of the embodiment serves as a black display at the time of not applying voltage (normally black mode).

On the other hand, when electric voltage is applied to the liquid crystal layer 50, the liquid crystal is tilted to be aligned to the substrate surface and thus characterizes the refractive-index anisotropy to the transmitted light. Therefore, the circular polarized light entering from the exterior side of the counter substrate 20 to the liquid crystal layer 50 is converted into the straight polarized light in the course of transmitting the liquid crystal layer 50 so as to reach the reflective electrode 39r. After the straight polarized light is reflected by the reflective electrode 39r, the reflected light transmits the liquid crystal layer 50 and then enters into the second wave plate 46 again. Since the reflected light is the circular polarized light of the rotation direction as the same as the above incident light, the reflected light is converted into the straight polarized light parallel to the transmissive axis of the second polarizing plate 24 by the second wave plate 46 so as to transmit the polarizing plate 24. Accordingly, the liquid crystal device 200 according to an aspect of the embodiment serves as a white display at the time of applying voltage.

By adjusting voltage applying to the liquid crystal layer 50, the electric voltage display may be embodied. In the embodiment, since the dielectric projection 55r is disposed in a location facing the middle of the reflective electrode 39r, the liquid crystal 51 is aligned vertically to the outline of the reflective electrode 39r. In the near the dielectric projection 55r, the liquid crystal 51 is tilted from the dielectric projection 55r to the exterior, and thus the liquid crystal 51 is aligned in the plane-emitted shape. Accordingly, in the liquid crystal device 200 according to an aspect of the embodiment, a director of the liquid crystal 51 is faced in all directions, thereby embodying the extremely wide-viewed display.

As an arrangement diagram of optic axes is illustrated in FIG. 8, in the liquid crystal device 200 according to an aspect of the embodiment, a retardation axes 136 and 146 of a wave plates 36 and 46 are arranged parallel to a second direction D2 and a first direction D1, respectively, and are arranged parallel to the Y axis direction (a transverse direction of the pixel electrode 39) and in the X axis direction (a longitudinal direction of the pixel electrode 39), respectively. That is, the retardation axis 136 of a first wave plate 36 is arranged parallel to the dielectric projection 55t extending in a first direction D1 (the X axis direction) so as to be perpendicular to a second direction D2 (the Y axis direction), a main alignment direction of the liquid crystal 51 determined by the dielectric projection 55t. In addition, the retardation axis 146 of a second wave plate 46 is parallel to the main alignment direction (the second direction D2) of the liquid crystal 51 determined by the dielectric projection 55t extending in the first direction D1. In the case of the embodiment, since the arrangement direction of the two dielectric projections 55t and 55r provided in the sub-pixel are parallel to the X axis direction, the retardation axis 136 of the first wave plate 36 are arranged parallel to the arrangement direction of the dielectric projection 55t and 55r.

According to an aspect of the above embodiment, the liquid crystal device 200 prevents transmissivity due to the dielectric projection 55t from decreasing, thereby obtaining a bright display.

Figure 9:
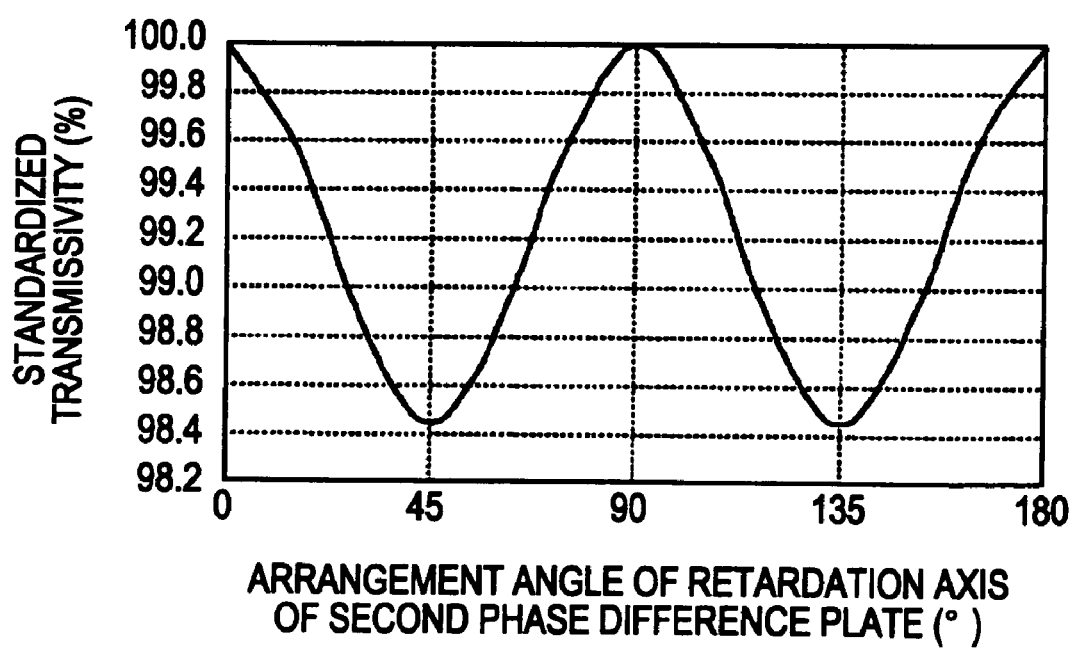
FIG. 9 is a graph showing relationship between an angle of a wave plate and transmissivity.

FIG. 9 is a graph showing the result of transmissivity variation regarding the white display when the polarizing plates 14 and 24 and the wave plates 36 and 46 are integrally rotated with the arrangement of the optic axes of the polarizing plates 14 and 24 and the wave plates 36 and 46 maintained in FIG. 8.

In the graph of FIG. 9, the horizontal axis indicates arranged angles of the retardation axis 146 of the second wave plate 46 and the vertical axis indicates standardized transmissivity, where the maximum transmissivity is 100%. Further, the arrangement of the optical axes is illustrated in FIG. 8 when the retardation axis 146 of the second wave plate 46 is arranged at 90° (parallel to the Y axis).

When the polarizing plates 14 and 24 and the wave plates 36 and 46 are rotated to the liquid crystal cell, transmissivity of the white display are changed in FIG. 9. When the retardation axis 146 of the second wave plate 46 is at 0° and 90°, the transmissivity becomes the maximum value. That is, when the retardation axis 146 of the second wave plate 46 is parallel to the second direction D2, that is, the retardation axis 136 of the first wave plate 36 is perpendicular to the second direction D2, the alignment direction of the liquid crystal determined by the dielectric projection 55$t$, the transmissivity of the white display become the maximum value. Accordingly, by arranging the retardation axes 136 and 146 of the wave plates 36 and 46 in the direction parallel or perpendicular to the alignment direction of the liquid crystal determined by the alignment control, a liquid crystal device with bright display may be embodied. Further, when the retardation axis 136 of the first wave plate 36 is exchanged with the retardation axis 146 of the second wave plate 46, the result is the same.

In the embodiment, the belt-shaped dielectric projection 55$t$ and the dot-shaped dielectric projection 55$r$ in the sub-pixel are provided, but the relationship between the alignment direction of the liquid crystal 51 and the retardation axis direction of the wave plates 36 and 46 determined by the belt-shaped dielectric projection 55$t$ is disclosed above. The biggest area in a plurality of a liquid crystal area formed in the sub-pixel is formed by the liquid crystal 51 aligned in the width direction of the dielectric projection 55$t$ (the Y axis direction) at the time of operating, since the liquid crystal area considerably affects the entire transmissivity.

Figure 10:
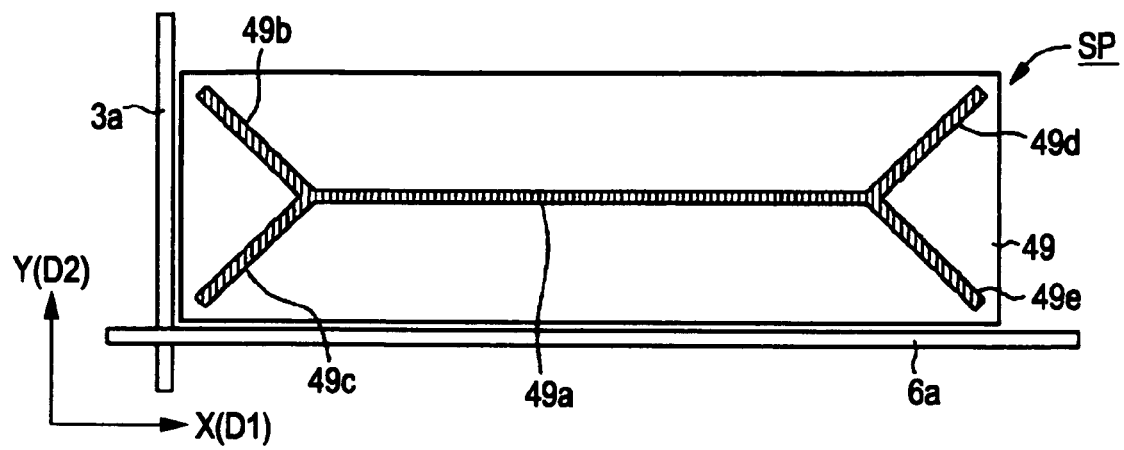
FIG. 10 is another embodiment of a sub-pixel.

In the each embodiment, the way how the alignment control portions in the sub-pixel (the opening 9$a$, etc, and the dielectric projections 21$a$ and 55$t$, etc) extend in the first direction or the second direction to be formed in the corresponding sub-pixel is described. However, the alignment control portion is not limited to each embodiment. For example, as shown in FIG. 10, in a rectangular-shaped pixel electrode 49, dielectric projections 49$a$ to 49$e$ are provided at a plane view. In this case, the dielectric projection 49$a$ extends in the X axis direction, the dielectric projections 49$b$ and 49$e$ extend in the right-descending direction, and the dielectric projections 49$c$ and 49$d$ extend in the right-ascending direction, so as to be formed. Therefore, an arrangement of retardation axes of wave plate in the sub-pixel is crucial. In a sub-pixel SP shown in FIG. 10, a liquid crystal area formed by a liquid crystal where an alignment direction is determined by the dielectric projection 49$a$ increases most in the sub-pixel. Accordingly, a retardation axis of a first and second wave plates is parallel or perpendicular to the alignment direction of the liquid crystal determined by the dielectric projection 49$a$.

Electronic Apparatus

Figure 11:
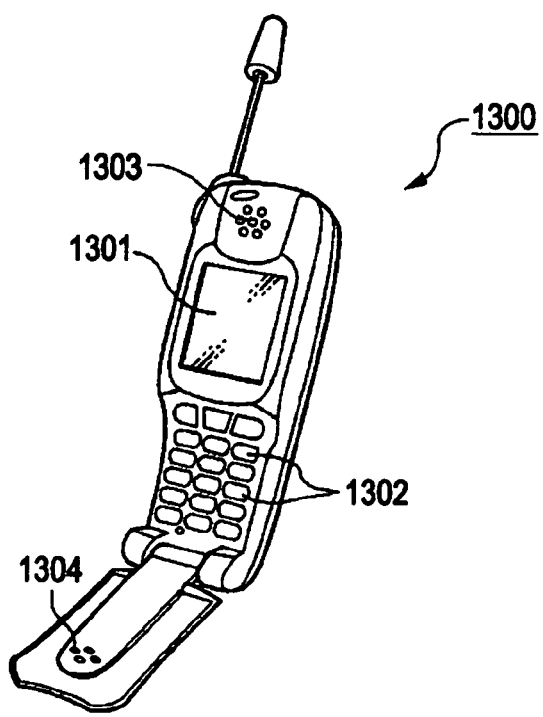
FIG. 11 is a perspective view illustrating an example of an electronic apparatus.

FIG. 11 is a perspective view showing one example of an electronic apparatus according to an aspect of the invention. A mobile phone 1300 includes a small-sized display 1301 of the liquid crystal device according to an aspect of the invention, a plurality of bottoms 1302, a receiver 1303, and a transmitter 1304.

The liquid crystal device according to the respective embodiments is not limited to the mobile phone, but may be used an image display unit of e-books, personal computers, digital cameras, liquid crystal device TVs, a viewfinder type or monitor direct view type of videotapes, recorders, vehicle-navigators, pagers, electronic schedulers, calculators, word-processors, workstations, television phones, POS terminals, apparatuses having a touch panel, etc. In any electronic apparatus, it is possible to display an image with high brightness.

The entire disclosure of Japanese Patent Application No. 2005-357477, filed Dec. 12, 2005 is expressly incorporated by reference herein.

What is claimed is:

1. A liquid crystal device in which a liquid crystal layer formed of a liquid crystal having a negative dielectric anisotropy is interposed between a first substrate and a second substrate disposed opposite to each other, the liquid crystal device comprising:
   an alignment film controlling the liquid crystal in a vertical direction at the time of non-applying voltage, the alignment film being disposed between the liquid crystal layer and the first substrate and between the liquid crystal layer and the second substrate;
   a first wave plate and a first polarizing plate provided on a surface of the first substrate opposite to the liquid crystal layer;
   a second wave plate and a second polarizing plate provided on a surface of the second substrate opposite to the liquid crystal layer;
   an alignment control portion provided in both a transmissive display area and a reflective display area of a pixel area, and controlling alignment of the liquid crystal of the liquid crystal layer at the time of applying voltage, the alignment control portion being provided on at least one of the first substrate and the second substrate; and
   a plurality of island-shaped electrodes including a longitudinal island-shaped electrode being formed in the pixel area and the alignment control portion, extending in the longitudinal direction of the island-shaped electrode, being disposed in a plane area of the longitudinal island-shaped electrode and the liquid crystal therebetween, wherein
   retardation axes of the first wave plate and the second wave plate are approximately perpendicular to each other, and at least one of the retardation axis of the first wave plate and the retardation axis of the second wave plate is arranged approximately parallel to a main alignment direction of the liquid crystal aligned by the alignment control portion,
   at least one of the retardation axis of the first wave plate and the retardation axis of the second wave plate is approximately parallel to the extending direction of the alignment control portion, and
   wherein the alignment control portion includes a plurality of dielectric projections projecting into the liquid crystal layer from an electrode provided on the liquid crystal layer side of one of the first substrate and the second substrate, a first dielectric projection being substantially stripe-shaped and formed in the transmissive display area and a second dielectric projection being substantially circular and formed in the reflective display area.

2. The liquid crystal device according to claim 1, wherein openings are formed in the electrode, and combinations of the dielectric projections and the openings are formed.

3. The liquid crystal device according to claim 1, wherein the wave plates are a λ/4 wave plate for applying a substantial ¼ phase difference to transmitted light.

4. The liquid crystal device according to claim 3, wherein the wave plates are an inverse-dispersion λ/4 wave plate.

5. The liquid crystal device according to claim 1, wherein a transmissive display area and a reflective display area are defined in the pixel area, and
   wherein a liquid-crystal-layer thickness adjusting layer adjusting the thickness of the liquid crystal layer in the reflective display area to be smaller than the thickness of the liquid crystal layer in the transmissive display area is provided on the liquid crystal layer side of at least one of the first substrate and the second substrate.

6. An electronic apparatus comprising the liquid crystal device according to claim 1.

7. The liquid crystal device according to claim 1, wherein a first one of the island shaped portions of the pixel electrode is substantially shaped as an elongated octagon.

8. The liquid crystal device according to claim 7, wherein a position of the first stripe-shaped dielectric projection corresponds to a position of the first island shaped portion of the pixel electrode in a plan view.

9. The liquid crystal device according to claim 1, wherein a second one of the island shaped portions of the pixel electrode is substantially shaped as a regular octagon.

10. The liquid crystal device according to claim 9, wherein a position of the second circular dielectric projection corresponds to a position of the second island shaped portion of the pixel electrode in a plan view.

11. The liquid crystal device according to claim 1, wherein a first one of the island shaped portions of the pixel electrode is an elongated rectangular shape having rounded corners, and a second one of the island shaped portions of the pixel electrode is a substantially square shape having rounded corners.

* * * * *